United States Patent Office 3,311,614
Patented Mar. 28, 1967

3,311,614
HETEROCYCLIC AMIDES AND METHODS FOR THEIR PRODUCTION
David B. Capps, Ann Arbor, Mich., assignor to Parke, Davis & Company, Detroit, Mich., a corporation of Michigan
No Drawing. Filed May 13, 1965, Ser. No. 455,654
6 Claims. (Cl. 260—239.3)

The present invention relates to new heterocyclic amide compounds and to methods for their production. More particularly, the invention relates to new N-(5-nitro-2-thiazolyl)-heterocyclic amide compounds, having the formula

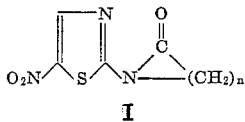

I where $n$ is 3, 4, or 5.

In accordance with the invention, compounds having the above formula are produced by the cyclization of an ω - halo - N - (5 - nitro - 2 - thiazoyl)-carboxamide compound, having the formula,

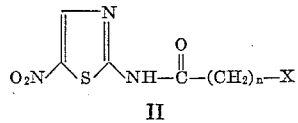

II where $n$ is as defined previously and X is bromine or chlorine. The cyclization can be accomplished simply by heating the compound of Formula II at a temperature well above its melting-point until gas evolution ceases. The cyclization is preferably accomplished, however, by reacting the compound of Formula II with a base in an unreactive solvent medium. Any of a number of inorganic and organic bases may be used in the reaction, including the following: alkali metal carbonates, such as potassium carbonate and sodium carbonate; alkali metal alkanoates, such as sodium acetate; alkaline earth metal carbonates, such as calcium carbonate; alkaline earth metal oxides and hydroxides, such as calcium hydroxide, calcium oxide, magnesium oxide, and magnesium hydroxide; and tertiary amines, such as pyridine, quinoline, triethylamine, N,N-dimethylaniline, N-methylpiperidine, and 2-, 3-, and 4-picoline. The preferred base is an alkali metal carbonate. Suitable unreactive solvents that may be used include aromatic hydrocarbons, such as benzene, toluene, and xylene; chlorinated hydrocarbons, such as trichloroethane and chlorobenzene; lower aliphatic ketones, such as acetone and 2-butanone; tertialy amides, such as N,N-dimethylformamide and N,N-dimethylacetamide; ethers, such as tetrahydrofuran and dioxane; acetonitrile; dimethylsulfoxide; and mixtures of these. The organic tertiary amines listed above as basic reactants may also be used as solvents, if employed in large excess. In such a case, additional solvent is not required. The temperature of the reaction is not critical and may be varied from room temperature to 220° C. The duration of the reaction is likewise not critical and may be varied from about 10 minutes to 72 hours. Preferred conditions are a temperature in the range of 100–140° C. and a period of one to five hours. At least one equivalent of base is required. For best results, a large excess, up to about 10-fold, of base is preferably employed.

The ω-halo-N-(5-nitro-2-thiazolyl)carboxamide compounds, having Formula II, that are used as starting materials in the foregoing process, are prepared by reacting 2-amino-5-nitrothiazole with a reactive derivative, preferably the acid chloride, of an ω-haloalkanoic acid, having the formula $$X—(CH_2)_n—CO_2H$$

III where $n$ and X are as defined previously.

The compounds of the invention are new chemical compounds that are useful pharmacological agents. They are anti-parasitic agents that are active against a number of internal parasites, including *S. mansoni*, *E. histolytica*, and *T. vaginalis*.

The invention is illustrated by the following examples:

EXAMPLE 1

A stirred mixture consisting of 150 g. of 4-chloro-N-(5-nitro-2-thiazolyl)butyramide, 750 g. of finely powdered potassium carbonate, and 3000 ml. of toluene is slowly heated to reflux over a 75-minute period and kept at that temperature for 80 minutes more. The mixture is then filtered, and the filtrate is concentrated to a volume of about 1000 ml. and diluted while hot with 2000 ml. of hot cyclohexane. Upon cooling, there is obtained a solid precipitate of 1-(5 nitro-2-thiazolyl)-2-pyrrolidinone, which is isolated and dried; M.P. 123.5–125° C., following crystallization from aqueous methanol.

In the foregoing procedure, the same product is obtained when 176 g. of 4-bromo-N-(5-nitro-2-thiazolyl)-butyramide is substituted for the 4-chloro-N-(5-nitro-2-thiazolyl)butyramide and 300 ml. of pyridine is substituted for the potassium carbonate.

The 4-chloro-N-(5-nitro-2-thiazolyl)butyramide used as starting material in the foregoing procedure is prepared as follows. Over a period of 30 minutes, while maintaining the temperature at 5° C., a solution of 100 g. of 4-chlorobutyryl chloride in 250 ml. of acetone is added to a stirred mixture consisting of 87 g. of 2-amino-5-nitrothiazole, 56 g. of pyridine, and 400 ml. of N,N-dimethylformamide. The reaction mixture is allowed to warm to room temperature, and after one hour is poured with stirring into 2000 ml. of an ice-water mixture. The solid 4-chloro-N-(5-nitro-2-thiazolyl)butyramide that precipitates is isolated, washed with water, dried, and crystallized from benzene. The crystallized solid product, M.P. 157–160° C., contains one-half formula weight of benzene of crystallization.

4-bromo-N-(5-nitro-2-thiazolyl)butyramide is prepared in a similar manner from the reaction of 131 g. of 4-bromobutyryl chloride and 87 g. of 2-amino-5-nitrothiazole.

EXAMPLE 2

A mixture consisting of 19 g. of 5-chloro-N-(5-nitro-2-thiazolyl)valeramide, 100 g. of powdered potassium carbonate, and 900 ml. of xylene is stirred and heated at 110° C. for 2 hours. The reaction mixture is then filtered, and the filtrate is evaporated under reduced pressure to give 1-(5-nitro-2-thiazolyl) - 2 - piperidone; M.P. 126–128° C., following crystallization from ethyl acetate-isooctane.

The 5-chloro-N-(5-nitro-2-thiazolyl)valeramide used as starting material in the above procedure is prepared as follows. Over a period of 75 minutes, while maintaining the temperature at 0–5° C., a solution of 17 g. of 5-chlorovaleryl chloride in 200 ml. of ether is added to a stirred mixture consisting of 14.5 g. of 2-amino-5-nitrothiazole, 8.7 g. of pyridine, and 75 ml. of N,N-dimethylforamide. The mixture is stirred for an additional hour at 0–5° C. and then for 3 hours at room temperature. Water (400 ml.) is added, and the mixture is extracted with 2000 ml. of ethyl acetate. The ethyl acetate solution is separated, washed with water, dried, and evaporated to dryness. The solid 5-chloro-N-(5-nitro-2-thiazolyl)valeramide thus obtained is crystallized from ethyl acetate-isooctane; M.P. 158–159° C.

EXAMPLE 3

A mixture consisting of 46 g. of 6-bromo-N-(5-nitro-2-thiazolyl)hexanamide, 250 g. of finely-powdered potassium carbonate, and 2000 ml. of toluene is heated under reflux for 90 minutes. The mixture is then filtered, and the filtrate is evaporated under reduced pressure to give hexahydro - 1 - (5 -nitro - 2 - thiazolyl) - 2H - azepin - 2- one; M.P. 126.5–128° C., following successive crystallizations from benzene-isooctane and aqueous methanol.

In the foregoing procedure, the same product is obtained when 40 g. of 6-chloro-N-(5-nitro-2-thiazolyl)-hexanamide is substituted for the 6-bromo-N-(5-nitro-2-thiazolyl)hexanamide.

The 6-bromo-N-(5-nitro-2-thiazolyl)hexanamide, M.P. 143–145° C., used as a starting material in the above procedure, is prepared from the reaction of 14.5 g. of 2-amino-5-nitrothiazole and 23.5 g. of 6-bromohexanoyl chloride according to the procedure described in Example 2 above for the preparation of 5-chloro-N-(5-nitro-2 - thiazolyl)valeramide. 6 - chloro - N - (5 - nitro - 2- thiazolyl)hexanamide is prepared in a similar manner from the reaction of 14.5 g. of 2-amino-5-nitrothiazole and 18.6 g. of 6-chlorohexanoyl chloride.

What is claimed is:
1. An N-(5-nitro-2-thiazolyl)-heterocyclic amide compound, having the formula,

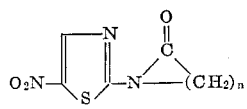

where $n$ is a positive integer greater than 2 and less than 6.
2. 1-(5-nitro-2-thiazolyl)-2-pyrrolidinone.
3. 1-(5-nitro-2-thiazolyl)-2-piperidone.
4. Hexahydro - 1 - (5 - nitro - 2 - thiazolyl) - 2H-azepin-2-one.
5. Process for the production of an N-(5-nitro-2-thiazolyl)-heterocyclic amide compound, having the formula

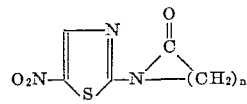

which comprises the reaction of an ω-halo-N-(5-nitro-2-thiazolyl)-carboxamide compound, having the formula

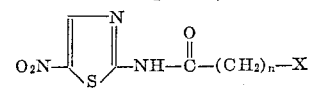

with a base in an unreactive solvent medium; where $n$ is a positive integer greater than 2 and less than 6 and X is a member of the class consisting of bromine and chlorine.
6. Process for the production of 1-(5-nitro-2-thiazolyl)-2-pyrrolidinone which comprises the reaction of 4-chloro-N-(5-nitro-2-thiazolyl)butyramide with a base in an unreactive solvent medium.

No references cited.

WALTER A. MODANCE, *Primary Examiner.*
ROBERT T. BOND, *Assistant Examiner.*